United States Patent Office 2,900,383
Patented Aug. 18, 1959

2,900,383

DEHYDRO-17α-CARBOXYETHYL-17β-HYDROXY-ANDROST-4-EN-3-ONE LACTONES

John A. Cella, Skokie, Ill., assignor to G. D. Searle & Co., Chicago, Ill., a corporation of Delaware No Drawing. Application December 18, 1957
Serial No. 703,491

4 Claims. (Cl. 260—239.57)

This invention relates to 17α-carboxy(ethyl and vinyl)-17β-hydroxyandrosta(di and tri)en-3-one lactones, and processes for the manufacture thereof. More particularly, this invention relates to compounds of the formula

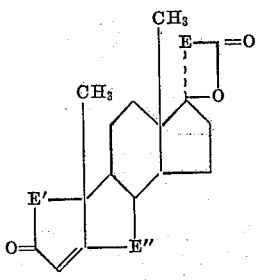

wherein E, E', and E" are selected from the group consisting of ethylene and vinylene radicals.

Equivalent to the foregoing lactones for purposes of the present invention are the hydroxy acids respectively in equilibrium therewith.

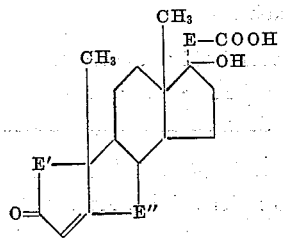

as also the salts derived upon alkalization of the said lactones and/or hydroxy acids

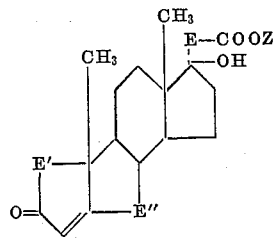

E, E', and E" unexceptionably having the meanings assigned in paragraph 1 hereof, and Z in the salt formula standing for an alkali metal or the ammonium radical.

The compounds of this invention are useful because of their valuable pharmacological activity. They block mineralocorticoid effects on urinary sodium and potassium without at the same time inducing other, undesirable responses in the animal body.

Manufacture of the subject compositions starts with 17α-carboxy(ethyl or vinyl)-17β-hydroxyandrost-4-en-3-one lactone, the choice depending on whether production of a propionic or acrylic acid lactone is contemplated. The starting steroid is converted to the $\Delta^{1,4}$ compositions of the invention either by aerobic fermentation with a dehydrogenating species of arthobacter bacteria, or by heating with selenous acid in the presence of tert.-butyl alcohol and a trace of acetic acid. The $\Delta^{4,6}$ products hereof, on the other hand, are derived from the aforesaid starting material by heating with a quinoid hydrogen acceptor such as chloranil—preferably as catalyzed by a strong, non-deleterious acid, for example, p-toluenesulfonic acid. The $\Delta^{1,4,6}$ products of the invention are obtained by the same oxidative procedure from the appropriate $\Delta^{1,4}$ compounds aforesaid, or, alternatively, they can be prepared by dehydrogenation of the corresponding $\Delta^{4,6}$ compositions via fermentation or treatment with selenous acid as described above.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

EXAMPLE 1

17α-carboxyethyl-17β-hydroxyandrosta-1,4-dien-3-one lactone

A liquid medium consisting of 24 parts of commercial beef extract, 40 parts of commercial peptone, and 8000 parts of tap water is sterilized by heating in an autoclave at 120° C. When cool, the medium is inoculated with a culture of arthrobacter sp., B-20178, which has grown for 72 hours at approximately 25° C. in a liquid medium having the same percentage composition as that described above. The resulting inoculated culture is incubated for 48 hours at approximately 25° C. during which time it is maintained in an aerated and agitated condition permitting the microorganism to grow in the submerged state. A solution of 2 parts of 17α-carboxyethyl-17β-hydroxyandrost-4-en-3-one lactone in 65 parts of acetone is then introduced, and incubation in the presence of the steroid is continued for an additional 30 hours. The incubate is thereupon stirred with an equi-volume quantity of dichloromethane for 1 hour, whereupon the enriched solvent is separated from the aqueous phase and the latter re-extracted with a second portion of dichloromethane. The two dichloromethane extracts are combined and evaporated to dryness. Chromatography of the residue on silica gel, using benzene and ethyl acetate as developing solvents, affords, in the eluate comprising 15 percent ethyl acetate, 17α-carboxyethyl-17β-hydroxyandrosta-1,4-dien-3-one lactone, which, recrystallized from ethyl acetate, melts at approximately 134–136° C. The product solidifies above this temperature and melts again at 179–180° C. 17α-carboxyethyl-17β-hydroxyandrosta-1,4-dien-3-one lactone has the formula

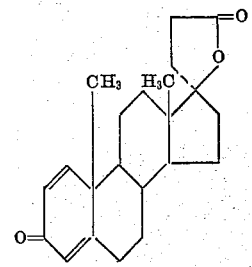

EXAMPLE 2

*17α-carboxyethyl-17β-hydroxyandrosta-4,6-dien-3-one lactone*

A solution of 5 parts of 17α-carboxyethyl-17β-hydroxyandrost-4-en-3-one lactone and 5 parts of chloranil in 400 parts of xylene containing a trace of p-toluenesulfonic acid is heated at the boiling point of the solvent under reflux overnight. The solution is then cooled and filtered through approximately 200 parts of silica gel. The gel is successively washed with 5 percent, 10 percent, and 15 percent ethyl acetate-benzene solutions, and the washings comprising 15 percent ethyl acetate are thereupon purified by chromatography on a further quantity of silica gel, using benzene and ethyl acetate as developing solvents. From the 15 percent ethyl acetate eluate there is obtained pure 17α - carboxyethyl - 17β-hydroxyandrosta-4,6-dien-3-one lactone, melting at 148–151° C. The product solidifies above this melting point and melts again at 165° C. 17α - carboxyethyl - 17β-hydroxyandrosta-4,6-dien-3-one lactone has the formula

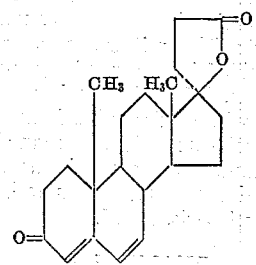

EXAMPLE 3

*17α-carboxyethyl-17β-hydroxyandrosta-1,4,6-trien-3-one lactone*

To a solution of 4 parts of 17α - carboxyethyl - 17β-hydroxyandrosta-4,6-dien-3-one lactone in 480 parts of tert.-butyl alcohol containing 6 parts of acetic acid is added 1 part of selenous acid. This solution is heated at the boiling point under reflux for a total of 24 hours, an additional 1 part of selenous acid being introduced at the end of the first 7 hours. The reaction mixture is next cooled and freed of selenium by filtration. The filtrate is stripped of solvent by vacuum distillation leaving a residue which is taken up in chloroform. The chloroform solution is washed with aqueous 5 percent sodium bicarbonate and then with water, whereupon it is dried over anhydrous sodium sulfate. Chloroform is evaporated and the residue chromatographed on silica gel, using benzene and ethyl acetate as developing solvents. From the eluate comprising 15 percent ethyl acetate there is obtained 17α-carboxyethyl-17β-hydroxyandrosta-1,4,6-triene-3-one lactone, which, recrystallized from methanol, incorporates methanol of crystallization and melts at 97–100° C. (with decomposition). After solidifying, this material melts at 136–138° C. The non-solvated product has the formula

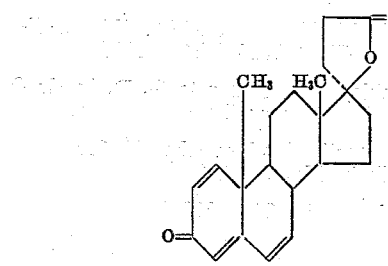

What is claimed is:

1. A compound of the formula

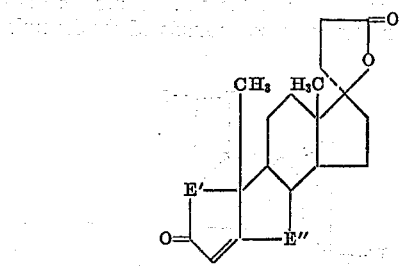

wherein E', and E" are selected from the group consisting of ethylene and vinylene radicals, at least one of the radicals selected being vinylene.

2. 17α - carboxyethyl - 17β - hydroxyandrosta - 1,4-dien-3-one lactone.

3. 17α - carboxyethyl - 17β - hydroxyandrosta - 4,6-dien-3-one lactone.

4. 17α - carboxyethyl - 17β - hydroxyandrosta - 1,4,6-trien-3-one lactone.

References Cited in the file of this patent

UNITED STATES PATENTS 2,705,712     Cella                    Apr. 5, 1955

OTHER REFERENCES

Meystre et al.: Helv. Chim. Acta., vol. 39, pages 734–42 (1956).

Chem. and Eng. News, Sept. 16, 1957, pages 66–67.